United States Patent [19]

Boyle et al.

[11] 4,084,430

[45] Apr. 18, 1978

[54] LOAD MEASUREMENT

[75] Inventors: Henry Bryant Boyle, Laleham; Alexander James Johnson, Greyshott, both of England

[73] Assignee: United Kingdom of Great Britain and Northern Ireland, The Secretary of State for Industry in Her Britannic Majesty's Government of the, London, England

[21] Appl. No.: 721,860

[22] Filed: Sep. 9, 1976

[30] Foreign Application Priority Data

Sep. 10, 1975 United Kingdom .............. 37303/75

[51] Int. Cl.² ............................................. G01L 1/02
[52] U.S. Cl. ............................... 73/141 R; 73/170 A; 73/189
[58] Field of Search ................. 73/141 R, 170 A, 189; 177/208, 209

[56] References Cited

U.S. PATENT DOCUMENTS

| 750,593 | 1/1904 | Cady | 73/379 |
|---|---|---|---|
| 2,651,939 | 9/1953 | Weaver | 73/301 |
| 3,496,963 | 2/1970 | Bardgette et al. | 138/99 |
| 3,670,574 | 6/1972 | Edwards | 73/379 |
| 3,785,203 | 1/1974 | Mull | 73/189 X |
| 3,853,118 | 12/1974 | Schendel | 73/379 X |
| 3,940,984 | 3/1976 | Oram | 73/189 |

OTHER PUBLICATIONS

Russell et al.-"Ocean Wave Force Instrumentation Journal of Waterways and Harbors Division", Proceedings of American Society of Civil Engineers, vol. 92, No. WW4, Nov. 1966.

Primary Examiner—Charles A. Ruehl
Attorney, Agent, or Firm—Cameron, Kerkam, Sutton, Stowell & Stowell

[57] ABSTRACT

A device for measuring externally applied loads on a structural member, such as a support leg of an off-shore installation, comprises one or more flexible fluid-filled cells constrained between the surface of the structural member and a casing capable of transmitting externally applied loads to the structural member through the fluid within the cell(s), the loads applied to the member being derived by monitoring the fluid pressure within the cell(s). Preferably the cell(s) and casing are comprised in a sleeve-like assembly removably mounted upon the structural member and retained in position by friction.

11 Claims, 4 Drawing Figures

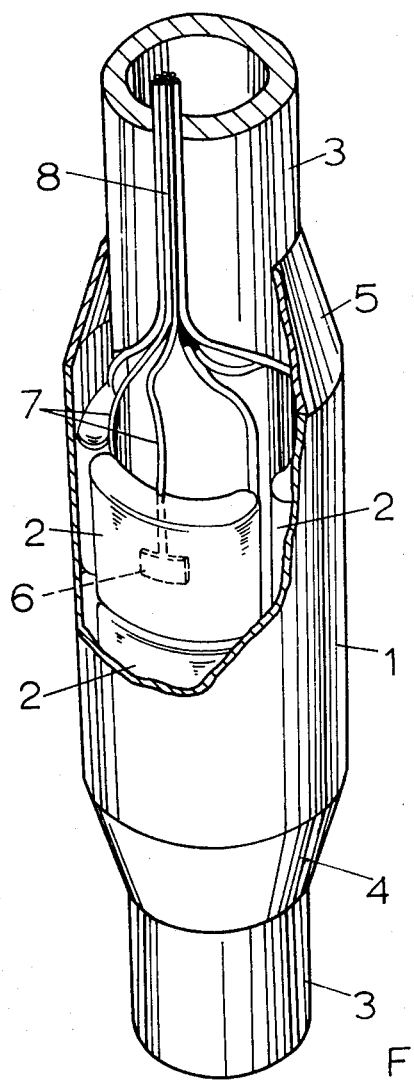
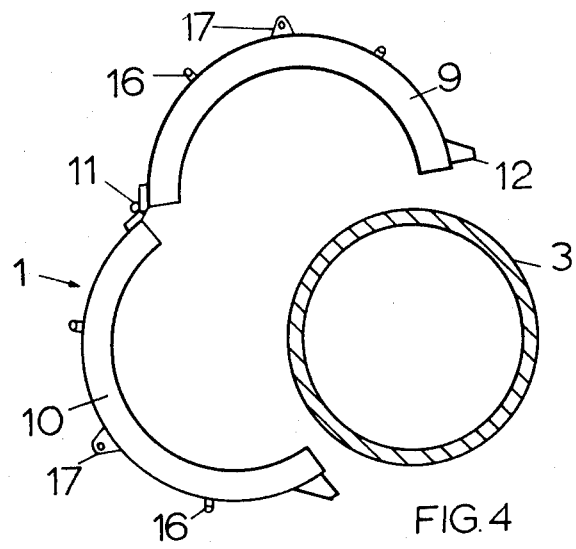
FIG. 1
FIG. 4

LOAD MEASUREMENT

The present invention relates to the measurement of externally applied loads on structural members. Particularly, though not exclusively, the invention is concerned with the measurement of loads on structural members arising from the exposure of such members to fluid flows. An important example of this is the measurement of the hydrodynamic loading of submerged support structures for off-shore installations, although the invention may also find application in the measurement of loads arising from air flows, e.g. in the measurement of the wind loading of buildings or in wind-tunnel testing.

In accordance with a first aspect of the invention a device for measuring an externally applied load on a structural member comprises one or more flexible fluid-filled cells, means to sense the fluid pressure within the or each cell or the relative fluid pressures within different cells, and a casing for constraining the or each cell between itself and the surface of the structural member the load on which is to be measured, said casing being capable of transmitting an externally applied load to said surface through the fluid within the or each cell.

In a second aspect, the invention resides in a method of measuring an externally applied load on a structural member which comprises the steps of: constraining one or more flexible fluid-filled cells between a casing and the surface of the structural member the load on which is to be measured, said casing transmitting an externally applied load to said surface through the fluid within the or each said cell; and sensing the fluid pressure within the or each said cell or the relative fluid pressures within different cells.

By monitoring the pressure of the fluid, (typically air), within a said cell the magnitude of the load applied to the portion of the surface of the structural member over which that cell extends can be derived, and by suitably disposing a plurality of such cells over the surface of the structural member the load distribution over the entire surface in question can be derived, as also can the resultant magnitude and direction of such loading. If it is required to know only the relative magnitudes of the loads applied to the respective portions of the surface of the member over which a plurality of cells extend it is sufficient only to monitor the relative fluid pressures within the cells.

In a preferred embodiment of a device according to the invention the casing and cells are comprised in a sleeve-like assembly adapted to embrace and be frictionally retained upon a structural member, for an example an elongate member such as one of the support legs of an off-shore drilling rig, production platform or the like. The frictional retention of the assembly is particularly advantageous as it requires the provision of no special attachment means on the structural member nor any other modification to the structure of that member. In order to facilitate the application of the sleeve-like assembly to the structural member the assembly may comprise two circumferential portions adapted to clamp the member between them. For example, the two portions of the assembly may be hinged together at one each of their circumferential ends, their other circumferential ends being adapted to be detachably fastened together.

The invention will now be more particularly described, by way of example, with reference to the accompanying drawings, in which:

FIG. 1 is a perspective, part-sectional, schematic view of a device according to the invention as applied to a structural member of cylindrical form;

FIG. 4 shows in plan the measuring device of FIGS. 1 to 3 in the course of being applied to the structural member.

Figure 2:
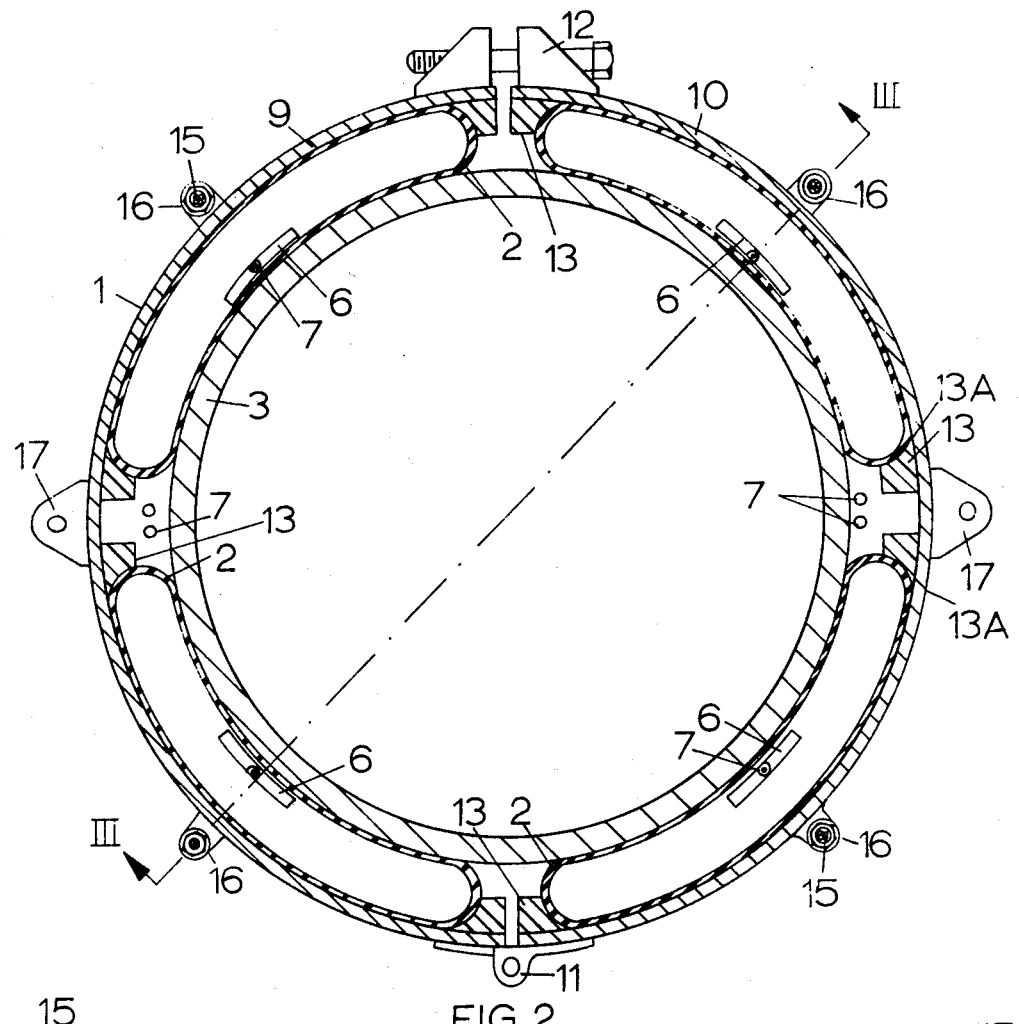
FIG. 2 is a transverse cross-section through the apparatus of FIG. 1.

Referring to FIG. 1, the illustrated measuring device comprises a flexible casing 1 in the form of a generally cylindrical sleeve which acts to constrain eight flexible air-filled cells 2 between itself and the surface of a cylindrical tubular structural member 3. The cells 2 are disposed in two axially spaced circumferential series of four upon the member 3, which by way of example will be described as the submerged portion of a support leg for an off-shore drilling rig. At the two longitudinal ends of the casing there are disposed rigid or inflatable fairings 4 and 5 which act to smoothly blend the contour of the casing with that of member 3. Each cell 2 is provided with an electrical pressure transducer 6 sensitive to the pressure within the cell, output leads 7 from the transducers being gathered together into a cable 8 passing through fairing 5 and up to a monitoring station above sea level.

Figure 3:
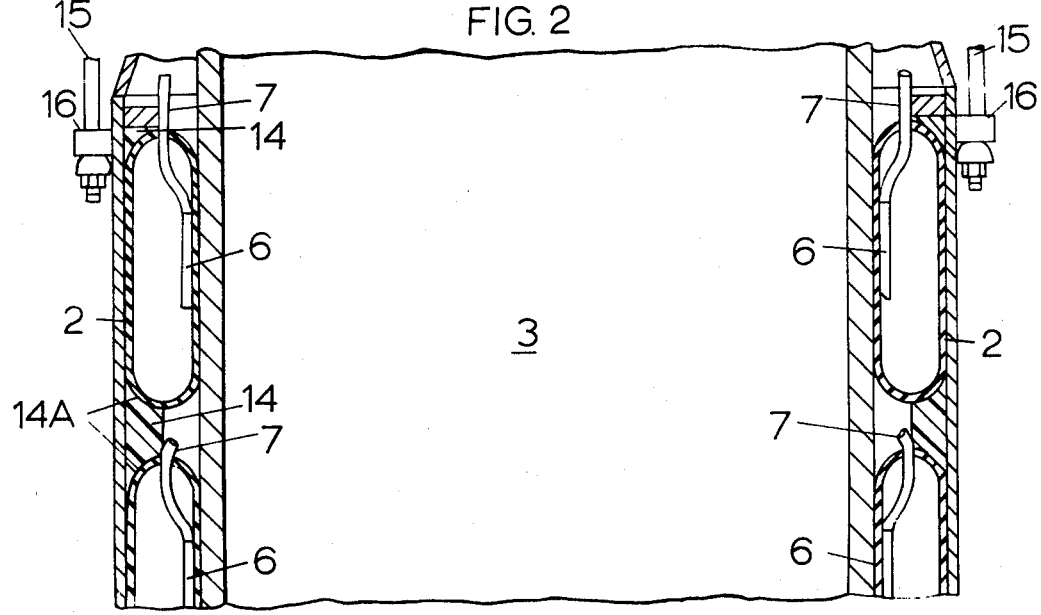
FIG. 3 is a partial longitudinal cross-section on the line III—III of FIG. 2.

The construction of the measuring device is more fully shown in FIGS. 2 and 3. The assembly of casing 1 and cells 2 is in two circumferential portions 9 and 10 each of which is adapted to extend around one half of the circumference of member 3. At one each of their circumferential ends the portions 9 and 10 are coupled together by hinges 11, while their other circumferential ends bear respective coacting portions of one or more locking devices 12 by which those ends can be detachably fastened together to clamp the member 3. Elastomeric circumferential and longitudinal spacers 13 and 14 are cemented to the interior surface of casing 1 to ensure the correct location of cells 2, the cells in turn being cemented to the rims 13A and 14A of the spacers.

In use, the sleeve-like assembly of casing 1 and cells 2, with the cells in a deflated condition, is lowered from a location above sea level to the required position on the member 3 under test, being supported by lines such as 15 (FIG. 3) attached to lugs 16 on the exterior surface of casing 1 towards the upper end of the assembly. At this point the assembly is in the open condition indicated in FIG. 4. The assembly is then manoeuvred to embrace the member 3 with the two portions 9 and 10 of the assembly being brought together about hinges 11 until the coacting portions of locking device(s) 12 engage; this can be achieved, e.g. by the use of lines attached to handling lugs 17 on the exterior surface of casing 1. The device(s) 12 are tightened and the cells 2 inflated to a suitable pressure, whereupon the member 3 is firmly clamped between portions 9 and 10 of the assembly and the support lines 15 can be removed if desired. The fairings 4 and 5 may also be incorporated in the hinged assembly along with casing 1 and cells 2 if convenient, or else they may be separate elements applied separately to member 3 after the casing and cells are in position.

With the casing 1 and inflated cells 2 in position on member 3 as shown in FIGS. 1 to 3, hydrodynamic loads applied to the casing will be transmitted through the air in the cells and reacted by the surface of member 3 thereby causing changes in the pressure within the cells which are monitored by way of tranducers 6. As will be evident from FIG. 2, the whole of the externally applied load will be transmitted to the surface of member 3 solely through the air within the cells 2, because at no point in the periphery of member 3 does the casing 1 directly contact the member 3. When suitably calibrated, the output from each transducer can thereby be employed to give the magnitude of the load applied to the portion of the surface of member 3 over which the respective cell extends, and the load values obtained for various portions of the surface can be summed to obtain the overall magnitude and direction of the loading upon the total surface in question. Clearly, if greater resolution of the load distribution upon the same surface is required a greater number of smaller cells will be employed.

It will be appreciated that by virtue of the closeness with which the contour of casing 1 conforms to that of member 3 over the portion under test, (with regard to both size and form), the loads which are applied to casing 1, transmitted to member 3 and measured via transducers 6 will be substantially those which would have been applied to member 3 by the same external flow conditions in the absence of the measuring device. The use of fairings 4 and 5 also helps to ensure that the presence of the measuring device does not significantly perturb the external flow in any way differently to member 3 alone. By virtue of the compressibility of the fluid within cells 2 the contour of the flexible casing 1 will in use depart from a true cylindrical form under varying conditions of loading but such departure will not generally be such as to significantly affect the validity of the readings obtained from the measuring device. However, if in any particular case it was desired that there be no deflection of casing 1, an incompressible fluid, such as water, could be used in place of the air in cells 2.

It will also be appreciated that by virtue of the frictional retention of the casing and cells upon member 3 no special attachment means are required to be provided on the member, nor is any other modification to the structure of the member required. The method of application of the hinged sleeve to the member is relatively simple and quick and the sleeve can readily be applied in like manner at different axial locations on the same member or like members. Although the sleeve has been described in terms of its application to a cylindrical structural member it will be understood that by virtue of the inherent flexibility of its component parts the sleeve will be somewhat tolerant of departures from a true cylindrical form in the members to which it is applied. Sleeves specifically adapted to be applied to structural members of other cross-sections can be constructed in a similar fashion to the generally cylindrical sleeve herein described, and the number, size and relative disposition of the cells in all such sleeves is open to considerable variation.

We claim:

1. A device for measuring an externally applied load on a structural member, comprising:
   one or more flexible fluid-filled cells;
   means for sensing the fluid pressure within the or each cell or the relative fluid pressures within different cells; and
   a flexible casing for constraining the or each cell between itself and the surface of the structural member the load on which is to be measured, said casing being adapted to surround the structural member and to transmit the whole of the externally applied load to said surface solely through the fluid within the or each cell, the pressure of said fluid thereby varying with said load.

2. A device according to claim 1 wherein said casing and the or each cell are comprised in a sleeve-like assembly so constructed and arranged as to surround and be frictionally retained upon the structural member.

3. A device according to claim 2 wherein said assembly comprises two circumferential portions so constructed and arranged as to clamp the structural member between them.

4. A device according to claim 1 wherein a respective electrical pressure transducer is located within the or each said cell for sensing the fluid pressure therewith.

5. A device according to claim 1 wherein the cell or cells are so constructed and arranged as to extend over substantially the whole of the surface area of the structural member the load on which is to be measured.

6. A device for measuring an externally applied load on a structural member, comprising:
   one or more flexible fluid-filled cells;
   means for sensing the fluid pressure within the or each cell or the relative fluid pressures within different cells; and
   a flexible casing for constraining the or each cell between itself and the surface of the structural member the load on which is to be measured, said casing being adapted to surround the structural member and to transmit the whole of the externally applied load to said surface solely through the fluid within the or each cell, the pressure of said fluid thereby varying with said load;
   said casing and the or each cell being comprised in a sleeve-like assembly comprising two circumferential portions so constructed and arranged as to surround and clamp the structural member between them and to be frictionally retained upon said member and,
   wherein the said two portions are hinged together at one each of their circumferential ends, the other circumferential ends of said portions including means for detachably fastening said other ends together.

7. A device for measuring an externally applied load on a structural member, comprising:
   one or more flexible fluid-filled cells;
   means for sensing the fluid pressure within the or each cell or the relative fluid pressures within different cells; and
   a flexible casing for constraining the or each cell between itself and the surface of the structural member the load on which is to be measured, said casing being adapted to surround the structural member and to transmit the whole of the externally applied load to said surface solely through the fluid within the or each cell, the pressure of said fluid thereby varing with said load;
   said casing and the or each cell being comprised in a sleeve-like assembly comprising two circumferential portions so constructed and arranged as to surround and be frictionally retained upon the structural member, and further comprising fairings smoothly blending the contour of said casing with that of the structural member at each longitudinal end of the casing when said assembly is retained upon said member.

8. A device for measuring an externally applied load on a structural member, comprising:
one or more flexible fluid-filled cells;
means for sensing the fluid pressure within the or each cell or the relative fluid pressures within different cells;
a flexible casing for constraining the or each cell between itself and the surface of the structural member the load on which is to be measured, said casing being adapted to surround the structural member and to transmit the whole of the externally applied load to said surface solely through the fluid within the or each cell, the pressure of said fluid thereby varying with said load; and flexible spacers attached to the interior surface of said casing and serving to locate a plurality of said cells in a spaced relationship.

9. A method of measuring a externally applied load on a structural member which comprises the steps of: constraining one or more flexible fluid-filled cells between a flexible casing which surrounds the structural member and the surface of the structural member, said casing transmitting the whole of an externally applied load to said surface solely through the fluid within the or each said cell and causing the fluid pressure therewithin to vary with said load; and sensing the fluid pressure within the or each said cell or the relative fluid pressures within different cells.

10. A method according to claim 9 wherein said casing and the or each cell are comprised in a sleeve-like assembly and the method comprises the step of applying said assembly to the structural member so that the assembly embraces and is frictionally retained upon the structural member.

11. A method according to claim 9 wherein the cell or cells extend over substantially the whole of the surface area of said member over which said casing extends.

* * * * *